(12) United States Patent
Nikopour et al.

(10) Patent No.: US 9,614,576 B2
(45) Date of Patent: Apr. 4, 2017

(54) LOW COMPLEXITY RECEIVER AND METHOD FOR LOW DENSITY SIGNATURE MODULATION

(71) Applicant: Huawei Technologies Co., Ltd., Shenzhen (CN)

(72) Inventors: Hosein Nikopour, Kanata (CA); Alireza Bayesteh, Ottawa (CA); Mohammadhadi Baligh, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/212,583

(22) Filed: Mar. 14, 2014

(65) Prior Publication Data

US 2014/0269663 A1   Sep. 18, 2014

Related U.S. Application Data

(60) Provisional application No. 61/788,881, filed on Mar. 15, 2013.

(51) Int. Cl.
   *H04B 1/707*      (2011.01)
   *H04J 13/00*      (2011.01)

(52) U.S. Cl.
   CPC .......... *H04B 1/707* (2013.01); *H04J 13/0007* (2013.01)

(58) Field of Classification Search
   None
   See application file for complete search history.

(56) References Cited

U.S. PATENT DOCUMENTS 7,757,149 B2* 7/2010 Xin et al. ............ 714/752
8,020,078 B2* 9/2011 Richardson ......... 714/780
(Continued)

FOREIGN PATENT DOCUMENTS

| JP | 2008167357 A | 7/2008 |
| JP | 2008205547 A | 9/2008 |
| JP | 2016502357 A | 1/2016 |
| KR | 20060129285 A | 12/2006 |

OTHER PUBLICATIONS

Hoshyar, "Novel Low-Density Signature for Synchronous CDMA Systems Over AWGN Channel", IEEE Transactions on Signal Processing, vol. 56, No. 4, Apr. 2008 (on record, also see ISR for PCT/US2011/029300 dated Jul. 31, 2014).*

(Continued)

*Primary Examiner* — Mounir Moutaouakil
(74) *Attorney, Agent, or Firm* — Slater Matsil, LLP

(57) ABSTRACT

Method and apparatus embodiments are provided for low complexity message passing algorithm (MPA) detection with substantially minor or tolerated performance loss compared to the standard MPA. A method includes calculating, at a detector, a plurality of function nodes (FNs) according to a plurality of received multiplexing signals for a one or a plurality of user equipments (UEs) using a plurality of first MPA computations that map a plurality of variable nodes (VNs) corresponding to the UEs to the FNs and using a priori information in an initial vector of probabilities for each of the VNs, excluding from the first MPA computations a plurality of first relatively small multiplication terms, updating the probabilities for the VNs using the last calculated FNs and a plurality of second MPA computations that map the FNs to the VNs, and excluding a plurality of second relatively small multiplication terms from the second MPA calculations.

19 Claims, 11 Drawing Sheets

(56) References Cited

U.S. PATENT DOCUMENTS

| | | | |
|---|---|---|---|
| 9,356,649 B2 | 5/2016 | Baligh et al. | |
| 2005/0138520 A1 | 6/2005 | Richardson | |
| 2007/0234184 A1* | 10/2007 | Richardson | 714/780 |
| 2009/0290667 A1 | 11/2009 | McElwain | |
| 2010/0192043 A1* | 7/2010 | Alrod et al. | 714/763 |
| 2011/0142181 A1* | 6/2011 | Leshem et al. | 375/341 |
| 2011/0231731 A1* | 9/2011 | Gross et al. | 714/760 |
| 2015/0039959 A1* | 2/2015 | Gadat et al. | 714/752 |
| 2015/0071182 A1* | 3/2015 | Bayesteh et al. | 370/329 |

OTHER PUBLICATIONS

Kim et al., hereinafter "Kim", A New Reduced Complexity ML Detection Scheme for MIMO Systems, IEEE Transactions on Communications, vol. 58, No. 4, Apr. 2010 (on record, also see ISR for PCT/US2011/029300 dated Jul. 31, 2014).*

International Search Report received in Application No. PCT/US2014/029300, mailed Jul. 31, 2014, 11 pages.

Kim, Jin-Sung et al., "A New Reduced Complexity ML Detection Scheme for MIMO Systems," IEEE Transactions on Communications, vol. 58, No. 4, Apr. 2010, pp. 1302-1310.

Hoshyar, R., et al., "LDS-OFDM an Efficient Multiple Access Technique," 2010 IEEE 71st Vehicular Technology Conference, May 16-19, 2010, pp. 1-5.

Hoshyar, R., et al., "Novel Low-Density Signature for Synchronous CDMA Systems Over AWGN Channel," IEEE Transactions on Signal Processing, vol. 56, No. 4, Apr. 2008, pp. 1616-1626.

Razavi et al., "On Receiver Design for Uplink Low Density Signature OFDM (LDS-OFDM)", IEEE Transactions on Communications, vol. 60, No. 11, Nov. 2012, pp. 3499-3508.

* cited by examiner

LOW COMPLEXITY RECEIVER AND METHOD FOR LOW DENSITY SIGNATURE MODULATION

This application claims the benefit of U.S. Provisional Patent Application Ser. No. 61/788,881, filed on Mar. 15, 2013, and entitled "Low Complexity Receiver for Low Density Signature Modulation," which application is incorporated herein by reference.

TECHNICAL FIELD

The present invention relates to wireless technology, and, in particular embodiments, to a low complexity receiver and method for low density signature modulation.

BACKGROUND

Low density signature (LDS) is a code division multiple access (CDMA) technique in which spreading sequences for data symbols are sparse. Message passing algorithm (MPA) is a multi-user detection based on belief propagation (BP) for LDS modulation. MPA complexity is high such that it might not be feasible for implementation in practice for some cases, for example for modulations with higher orders or large number of multiplexed LDS signatures. However, MPA is a near optimal solution for LDS reception. LDS with MPA reception may provide good performance and features, but it may not be as practical as other solutions, such as orthogonal frequency-division multiple access (OFDMA). Reducing MPA complexity for detecting LDS modulation without substantially changing performance can improve MPA feasibility and usability for detecting LDS modulation, and makes MPA more suitable for cases with higher modulation orders or large number of multiplexed LDS signatures.

SUMMARY OF THE INVENTION

In accordance with a preferred embodiment of the present invention, a method for detecting low density signature (LDS) transmissions includes calculating, at a detector, a plurality of function nodes (FNs) according to a plurality of received multiplexing signals for a one or a plurality of user equipments (UEs) using a plurality of first message passing algorithm (MPA) computations that map a plurality of variable nodes (VNs) corresponding to the UEs to the FNs and using a priori information in an initial vector of probabilities for each of the VNs. The method further includes excluding from the first MPA computations a plurality of first relatively small multiplication terms, updating the probabilities for the VNs using the last calculated FNs and a plurality of second MPA computations that map the FNs to the VNs, and excluding a plurality of second relatively small multiplication terms from the second MPA calculations.

In accordance with another preferred embodiment of the present invention, a network component for detecting LDS transmissions includes a processor and a computer readable storage medium storing programming for execution by the processor. The programming includes instructions to calculate a plurality of FNs according to a plurality of received multiplexing signals for a plurality of UEs using a plurality of first MPA computations that map a plurality of VNs corresponding to the UEs to the FNs and using a priori information in an initial vector of probabilities for each of the VNs. The programming further includes instructions to exclude from the first MPA computations a plurality of first relatively small multiplication terms, update the probabilities for the VNs using the last calculated FNs and a plurality of second MPA computations that map the FNs to the VNs, and exclude a plurality of second relatively small multiplication terms from the second MPA calculations.

In accordance with another preferred embodiment of the present invention, an apparatus for detecting LDS transmissions includes a detector configured to calculate, according to a plurality of received multiplexing signals for a plurality of UEs, a priori information in a vector of probabilities for each of a plurality of VNs using one or more iterations of a plurality of MPA computations that map between the VNs and a plurality of FNs until the probabilities converge within a predetermined threshold or a predetermined maximum number of MPA iterations is reached and to exclude from the MPA computations a plurality of relatively small multiplication terms. The apparatus further includes one or more decoders for the VNs coupled to the detector and configured to decode the probabilities for each of the VNs using the calculated probabilities for the VNs to obtain extrinsic information.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The structure and operation of presently preferred embodiments are discussed in detail below. It should be appreciated, however, that the present invention provides many applicable inventive concepts that can be embodied in a wide variety of specific contexts. The specific embodiments discussed are merely illustrative of specific ways to use the invention, and do not limit the scope of the invention.

Although MPA takes advantage of the sparse sequences in symbol multiplexing to reduce the complexity of the multi-user detection, there is still room to reduce the complexity of a MPA detector (in terms of computation time) while maintaining the near optimal performance of MPA. System and method embodiments are provided for enabling a low complexity MPA scheme with substantially minor or tolerated performance loss compared to the standard MPA. The low complexity MPA scheme can be implemented by a receiver (referred to herein as a "low complexity receiver") for LDS modulated transmissions. The low complexity MPA implementation may also be combined in the receiver with a soft input soft output (SISO) forward error correction (FEC) decoder and outer-loop feedback to further improve the performance of the LDS receiver. The low complexity MPA scheme can be used for higher modulation orders and/or large number of multiplexed LDS signatures, which may not be practical with the standard MPA.

Figure 1:
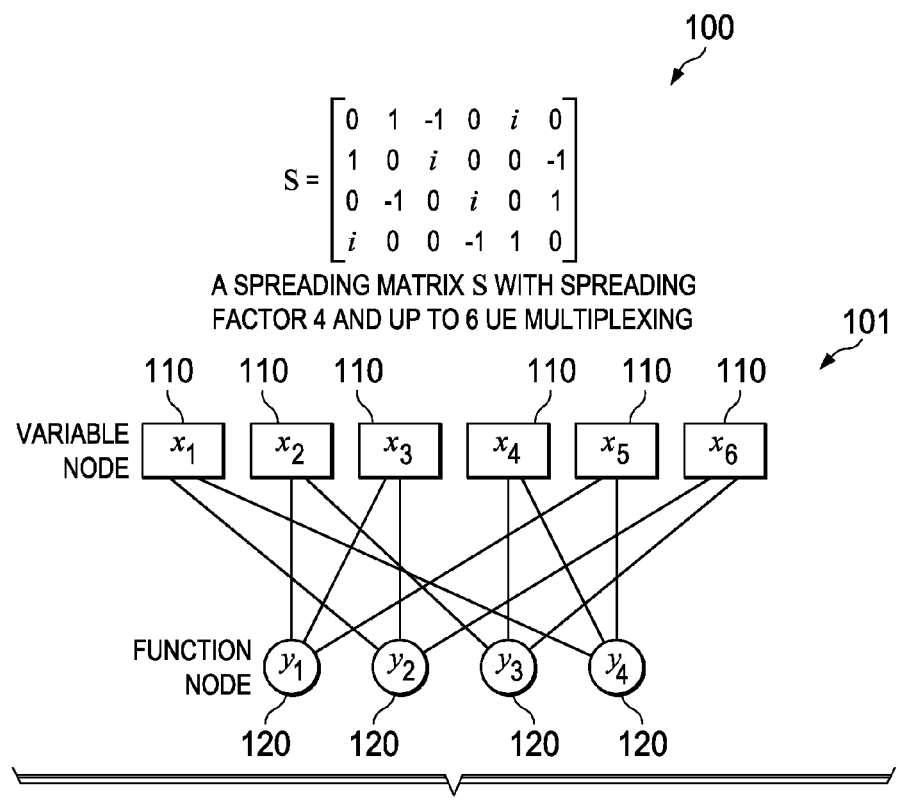
FIG. 1 shows a spreading matrix to determine a spreading sequence for low density signature (LDS) modulation.

FIG. 1 shows a spreading matrix (S) 100 that can be used to define a spreading sequence for LDS modulation (e.g., in transmission). The spreading matrix 100 can be implemented at a transmitter to determine output symbols (e.g., for OFDM) of multiplexed data for a plurality of user equipments (UEs) (e.g., in joint transmissions). The spreading matrix 100 has a spreading factor of 4 multiplexing signatures or signals for 6 UEs. The entries of the spreading matrix 100 designate the contributions for each of 6 symbols for 6 respective UEs to each of 4 output resources such as OFDMA tones. Each of the 6 columns is associated with one of the 6 signatures or the 6 UEs, and each of the 4 rows is associated with one of the 4 resources. In other examples, more than one signature can be allocated to a UE. While a 4×6 matrix is described, the invention is applicable to other matrices.

FIG. 1 also shows a graph 101 that connects 6 variable nodes 110 (labeled $x_1$, $x_2$, $X_3$, $x_4$, $x_5$, $x_6$) to 4 function nodes 120 (labeled $y_1$, $y_2$, $y_3$, $y_4$). The graph representation is used to map the relationship between the 6 UE symbols and the 4 resources or tones. Each branch between one variable node 110 and one function node 120 represents a vector of 4 probability values for 4 possible values (also referred to as constellation points) for that variable node 110. The 4 possible values represent the complete set of values from which one is assigned to the symbol for the UE corresponding to that variable node 110. Thus, the vector of 4 probabilities in the branch between one variable node 110 and one function node 120 represent a probability distribution (of the 4 possible values) for the contribution of one symbol (corresponding to that variable node 110) to one tone (corresponding to that function node 120).

The probability values in each branch may be log-likelihood ratios (LLRs) in the case of lower modulation orders, such as binary phase-shift keying (BPSK). In the case of higher modulations, such as Quadrature phase-shift keying (QPSK), the values may be normalized reliability values for each of the constellation points. For example, according to the entries in the spreading matrix 100, the function node $y_1$ is a combination of the following variable nodes: $x_1 - x_2 + i x_5$. Similarly, $y_2 = x_1 - i x_3 - i x_6$, $y_3 = -x_2 + i x_4 + x_6$, and $y_2 = i x_1 - x_4 + x_5$. The 4 multiplexing signatures or signals corresponding to the 4 function nodes 120 are transmitted jointly to a combined receiver for the 6 UEs, where the 4 received signals are then processed using the MPA to obtain the corresponding 6 symbols for the 6 UEs.

Figure 2:
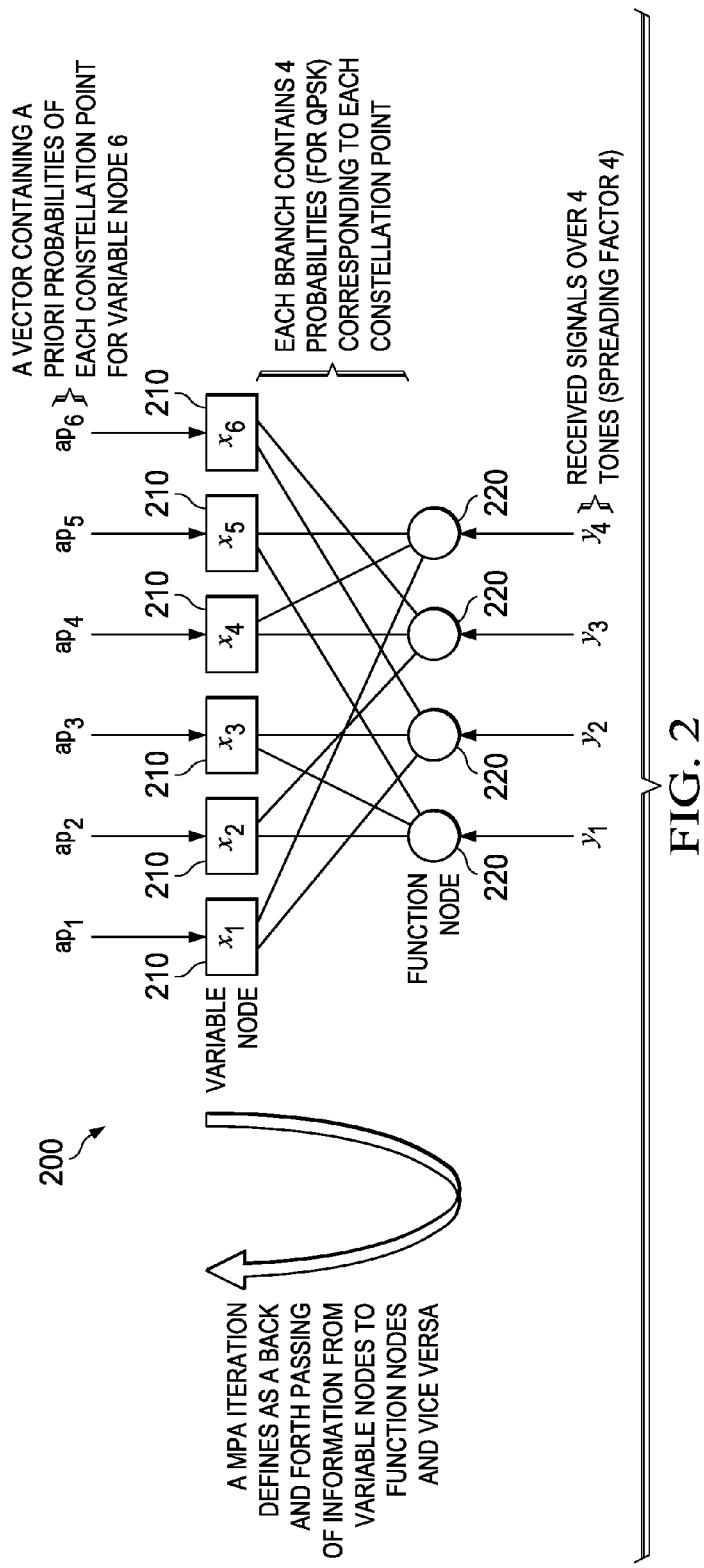
FIG. 2 shows a message passing algorithm (MPA) for LDS detection.

FIG. 2 illustrates a standard MPA scheme 200 that is used for LDS detection based on belief propagation (BP) for Low Density Parity Check (LDPC) decoding. The MPA scheme 200 can be used at a LDS detector that receives the 4 tones of FIG. 1. The MPA scheme 200 implements an iterative algorithm to determine the variable nodes (VNs) 210 for the 6 UEs from the 4 function nodes (FNs) 220. Initially a vector containing a priori (ap) probabilities is used for each of the 6 VNs 210 with the received 4 tones and the spreading matrix, S, to calculate the FNs 220. The 6 initial vectors for the 6 VNs 210 are labeled $ap_1$, $ap_2$, $ap_3$, $ap_4$, $ap_5$, $ap_6$.

The MPA scheme 200 iteratively updates the values of the FNs 220 according to the values of the VNs 210 (starting from the initial a priori values) and subsequently use the updated values of the FNs 220 to update the values of the VNs 210. Updating the vectors or values back and forth between the VNs 210 and the FNs 220 is also referred to as message passing or exchange between the two node sets. This back and forth information passing between the FNs 220 and the VNs 210 is repeated until the values of the VNs 210 converge to a solution. The converged probability values of the VNs 210 are then processed to determine each of the 6 symbols for the 6 UEs.

In an example of QPSK modulation, each branch in FIG. 2 between a VN 210 and a FN 220 represents a vector of probabilities that has a size of 4. Let V(n) be the vector for a set of VNs connected to FN n, and Z(k) be a set of FNs connected to VN k. Thus, the information transferred from FN n to VN k ∈ V(n) is a vector of size 4 that can be represented as $$I_{c_n \to u_k}(i) = \sum_{\substack{x^{[n]} \\ x_k = e^{j\frac{\pi}{4}(2i-1)}}} \exp\left(-\frac{1}{2\sigma^2}\|y_n - h^{[n]T}x^{[n]}\|^2\right) \prod_{m \in V(n)\setminus k} I_{u_m \to c_n}(x_m),$$

$$i = 1, 2, 3, 4,$$

and the information transferred from VN k to FN n ∈ Z(k) is a vector of size 4 that can be represented as $$I_{u_k \to c_n}(i) = \text{normalize}\left(ap_k(i) \prod_{m \in Z(k)\setminus n} I_{c_m \to u_k}(i)\right),$$

$$i = 1, 2, 3, 4.$$

The initial state can be $$I_{u_k \to c_n}^{(init)} = \left(\frac{1}{4}, \frac{1}{4}, \frac{1}{4}, \frac{1}{4}\right).$$

Table 1 shows the notation used in the equations and mathematical relations herein.

TABLE 1

Notation.

J: number of variable nodes = number of layers
N: number of function nodes = spreading factor
M: constellation size TABLE 1-continued Notation.

$d_v$: number of branches connected to a variable node
$d_f$: number of branches connected to a function node
$Nd_f = Jd_v$
Without loss of generality, a symmetric scenario in which all nodes have the same number of branches connected is considered
$n_{block}$: Number of spreading blocks
R: FEC code rate The MPA above is described by Hoshyar, et al., in "Novel Low-Density Signature for Synchronous CDMA Systems Over AWGN Channel," IEEE Transactions on Signal Processing, Vol. 56, No. 4, April 2008, and by Hoshyar, et al., in "Efficient Multiple Access Technique," IEEE 71st VTC 2010, pp. 1-5, both of which are incorporated herein by reference. The MPA is analyzed herein to determine a reduced number of computations necessary or needed to maintain the near optimal performance of MPA. The analysis shows that the complexity of the MPA can be reduced by reducing the number of necessary or needed computations without substantially sacrificing or reducing performance. For instance, the complexity of the MPA is reduced by reducing the number of multiplications. Reducing the number of multiplications may also reduce the number of summations in the MPA, where skipping some of the multiplication terms may also remove related summation terms.

Regarding the complexity of computations for VNs, the multiplications in the MPA are performed per MPA iteration and per spreading block (or branch) as $$I_{u_k \to c_n}(i) = ap_k(i) \underbrace{\prod_{m \in Z(k) \setminus n} I_{c_m \to u_k}(i)}_{(d_v - 2)},$$

$$i = 1, \ldots, M,$$
$$n = 1, \ldots, N,$$
$$k = 1, \ldots, d_f.$$

The number of multiplications per iteration per spreading block is found to be $$\text{Num of } Mul = JM \underbrace{d_v}_{\substack{\text{update a branch}}} \underbrace{(d_v - 1)}_{\substack{\text{update all braches of a node} \\ \text{for all constellation points} \\ \text{update all variable nodes}}},$$

and hence the number of multiplications for total iterations is $$T_{var,tot} = \sum_{f=1}^{n_{block}} iter_{MPA}(f) M J d_v (d_v - 1),$$

where $iter_{MPA}(f)$ denotes the number of iterations in spreading block f.

Regarding the complexity of computations for FNs, the multiplications in the MPA are performed per MPA iteration and per spreading block as $$I_{c_n \to u_k}(i) =$$

$$\underbrace{\sum_{\substack{x^{[n]} \\ x_k = C_i}}}_{M^{d_f - 1} \text{ combinations}} \exp\left(-\frac{1}{N_0} \|y_n - h^{[n]T} x^{[n]}\|^2\right) \underbrace{\prod_{m \in V(n) \setminus k} I_{u_m \to c_n}(x_m)}_{\substack{(d_f - 2) \text{ per combination} \\ \text{independent of } i}},$$

$$i = 1, 2, \ldots, M,$$
$$n = 1, \ldots, N,$$
$$k = 1, \ldots, d_f.$$

The number of multiplications per iteration per spreading block is found to be
Num of Mul=$Nd_f(M^{d_f-1}(d_f-2)+(M-1)M^{d_f-1})=Nd_fM^{d_f-1}(d_f-3+M)$, and hence the number of multiplications for total iterations is $$T_{func,tot} = \sum_{f=1}^{n_{block}} iter_{MPA}(f) N d_f M^{d_f - 1}(d_f - 3 + M).$$

The overall complexity of the MPA in terms of the total number of multiplications can be represented as $T_{MPA} = T_{var,tot} + T_{func,tot}$ (for both FNs and VNs). Further, the number of calculations for total iterations of a turbo decoder that may be used in a LDS receiver is $$T_{Turbo} = \sum_{j=1}^{J} iter_{turbo}(j) \log_2(M) R 2^{M+2} n_{Tone},$$

where $iter_{turbo}(j)$ denotes the number of turbo decoder iterations needed for decoding user j's data. Additionally, the probability calculator of a turbo MPA, which may also be used in the LDS receiver to improve performance as described in an embodiment below, is $T_{ap} = n_{block} M J (\log_2(M) - 1)$. Thus, the overall complexity in the LDS receiver using the above algorithms and turbo schemes becomes $T_{tot} = iter_{out}(T_{MPA} + T_{turbo} + T_{ap})$, where $iter_{out}$ denotes the number of outer loop iterations.

To reduce the complexity of calculations for a FN, some multiplication terms in the mathematical relations above can be neglected, such as exponential terms (e.g., exp(.) functions) that are considered relatively small to other terms, and terms where an incoming probability of a branch is considered relatively small to other terms. The terms can be determined to be relatively small when the values of such terms are less than a given threshold or according to a ratio with respect to other terms. The resulting total number of effective combinations for a branch of a FN is $T_n(k) \leq M^{d_f-1}$, and the number of multiplications with reduced complexity become $$T_{func,tot} = \sum_{v=1}^{n_{block}} iter_{MPA}(v) \sum_{n=1}^{N} \sum_{k=1}^{d_f} T_n(k)(d_f - 2) + (M - 1) T_n(k).$$

Therefore, the goal is to reduce the term $T_n(k)$. The exponential terms can also be calculated once at one iteration (e.g., initial iteration) and the obtained values can be then reused over the MPA iterations.

To reduce the complexity of calculations for a VN, some multiplication terms in the mathematical relations above can be neglected, such as exponential terms that are considered relatively small and terms where an incoming probability of a branch is considered relatively small, e.g., less than a given threshold or in comparison to other terms. The resulting total number of multiplications per variable node j is $V_j \leq d_v(d_v-1)$, and the number of multiplications with reduced complexity becomes $$T_{var,tot} = \sum_{f=1}^{n_{block}} iter_{MPA}(f) \sum_{j=1}^{J} MV_j.$$

Additionally, the term $iter_{MPA}(f)$ above is reduced in the MPA using early termination of the iterative process. The MPA iterations can be terminated early when the probabilities converge sufficiently by setting a convergence parameter. An early termination indicator may be a convergence measure that is defined on probability of constellation points at each VN. For instance, when the norm of the difference between the updated probabilities and their previous values are less than a predetermined threshold, the MPA iterations are terminated. As described above, the MPA complexity reduction is achieved by reducing the complexity of computations for FNs and for VNs by removing some computation terms as described above, and by using MPA early termination based on a convergence parameter.

Figure 3:
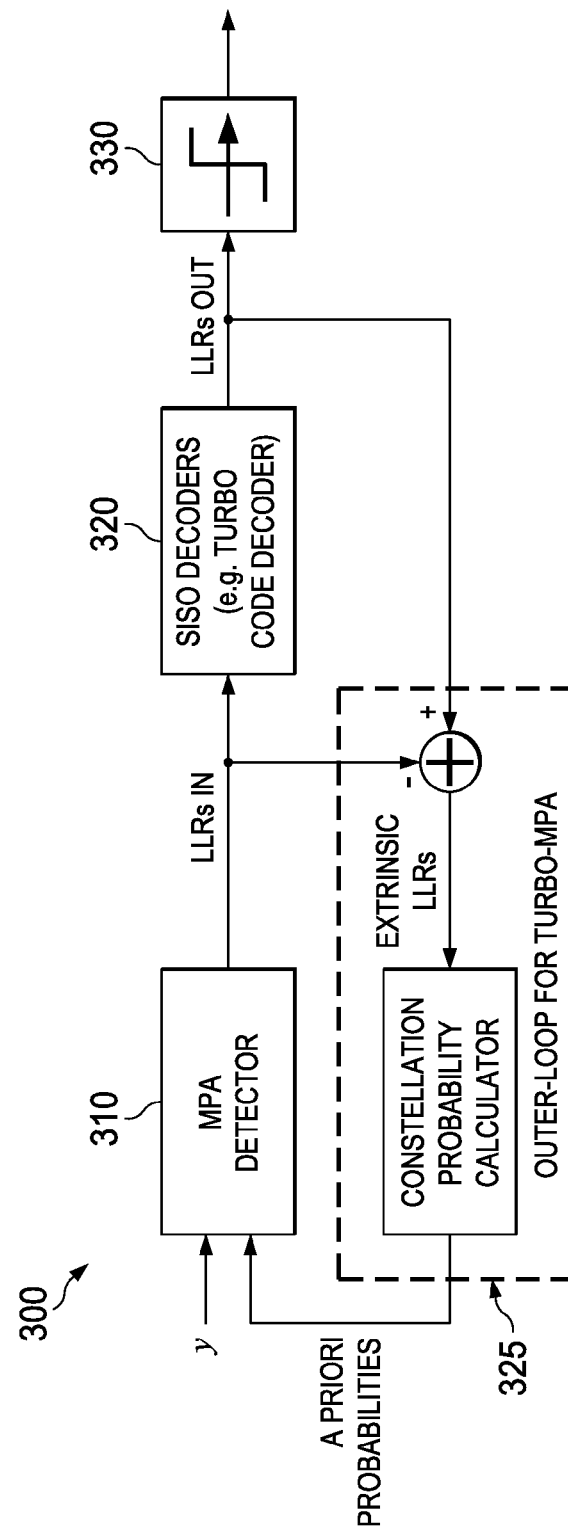
FIG. 3 is an embodiment of a LDS receiver with an outer-loop detection for MPA early termination.

FIG. 3 is an embodiment of a LDS receiver 300 that implements an outer-loop decision with a turbo code decoder and with outer-loop early termination of LDS detection. The LDS receiver 300 comprises a MPA detector 310 configured to implement a reduced complexity MPA as described above (by neglecting the exponential terms and terms where an incoming probability of a branch is considered relatively small, and by internal MPA early termination according to a convergence parameter). The reduced or low complexity MPA is achieved by reducing the number of computations for both FNs and VNs (by neglecting the relatively small exponential terms and terms where an incoming probability of a branch is relatively small) and by early termination of the MPA iterative process (according to a convergence parameter).

Additionally, the outer-loop of the turbo MPA detector 310 is terminated early based on the outer-loop early termination indicator, e.g., when the updated probabilities converge according to a threshold at FEC outputs. The LDS receiver 300 further comprises one or more soft input soft output (SISO) forward error correction (FEC) decoders 320 coupled to the output of the MPA detector 310. Each SISO decoder 320 may be used for a respective UE. The SISO decoder(s) 320 receive the LLRs or probability values from the MPA and process the received values to provide calculated LLRs or probability values for hard decision block 330 for each of the target UEs. The LDS receiver 300 also comprises an outer-loop for turbo-MPA 325 configured to determine updated a priori information for LDS detection (for the MPA detector 310) based on the output of the SISO decoder(s) 320.

The outer-loop for turbo-MPA 325 receives the probabilities (e.g., LLRs) at the output of the MPA detector 310 and at the output of the SISO decoders and calculates the difference between the LLRs to get extrinsic information. Extrinsic information of bits are used to update a priori information about constellation points of every VN (or UE). An outer-loop convergence criterion may be defined to early terminate the outer-loop iterations. After termination of outer-loop, the output of the SISO decoder(s) 320 is sent to the hard decision block(s) 330 for further processing. The decision blocks 330 for the target UEs process the corresponding probabilities to determine the respective bits for the target UEs. Using the outer-loop for turbo-MPA 325, the MPA for LDS detection can be terminated when the outer-loop early termination is met or a given maximum number of the iterations is reached. The outer-loop improves the performance compared to MPA with no outer-loop structure.

The additional outer-loop for turbo-MPA 325 component may add cost to the LDS receiver 300, but further improves the performance of the MPA for detecting LDS modulation (e.g., in term of speed). The improvement in performance can overweigh the increase in cost and is therefore justifiable for overall complexity of LDS detection and improving performance. Using the additional outer-loop for turbo-MPA 325 in the low complexity LDS receiver 300 is optional. For instance, in other embodiments, the MPA detector 310 implements the low complexity MPA with reduced complexity calculations for FNs and VNs and with early termination for MPA iterations without using the additional outer-loop for turbo-MPA 325, e.g., without further calculating extrinsic information and a priori probabilities and early termination outer-loop based on the output of the decoders.

Figure 4:
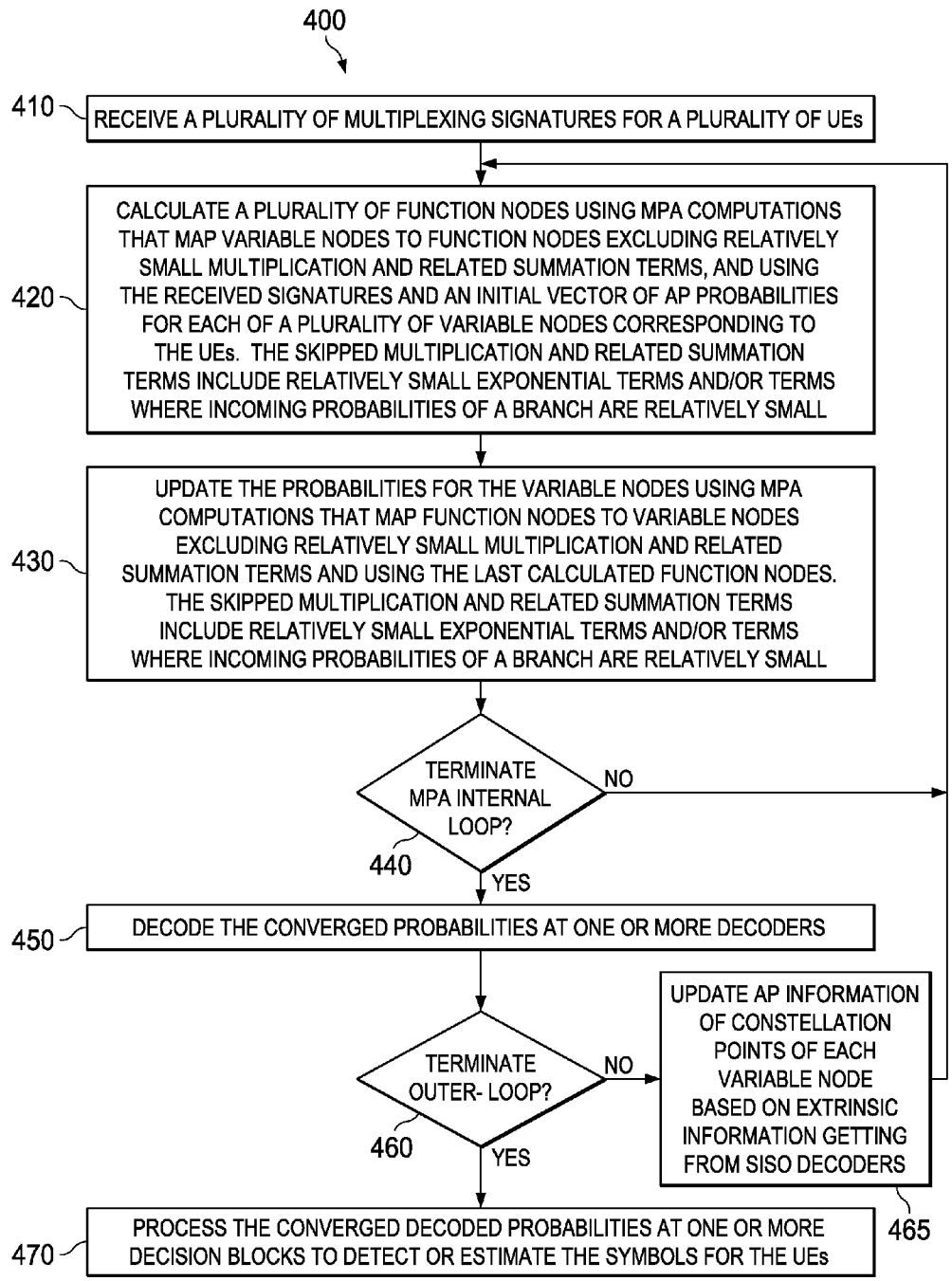
FIG. 4 is an embodiment of a reduced complexity MPA detection method.

FIG. 4 is an embodiment of a low complexity MPA that can be implemented at a low complexity LDS receiver, for instance at the LDS receiver 300. At step 410, a plurality of multiplexing channels or signatures for a plurality of UEs are received. For example 4 signals are received that multiplex 6 symbols for 6 corresponding UEs. At step 420, a plurality of FNs are calculated using MPA computations that map VNs to FNs excluding relatively small multiplication and related summation terms, and using the received multiplexing signatures and an initial vector of a priori (ap) probabilities for each of a plurality of VNs corresponding to the UEs. The spreading matrix that relates the multiplexing signals to the UE symbols is also used in the MPA to calculate the FNs. The skipped multiplication and related summation terms include relatively small exponential terms and/or terms where incoming probability of a branch are relatively small. The branches between the FNs and VNs are determined by the spreading matrix. The size of the relatively small terms can be determined based on a predetermined threshold or a minimum ratio with respect to other computation or multiplication terms of the MPA (e.g., less than 5% the size of other terms).

At step 430, the probabilities for the VNs are updated using MPA computations that map FNs to VNs excluding relatively small multiplication and related summation terms and using the last calculated FNs. The spreading matrix that relates the multiplexing signals to the UE symbols are also used in the MPA to calculate the VNs. The skipped multiplication and related summation terms include relatively small exponential terms and/or terms where incoming probability of a branch are relatively small. The size of the relatively small terms can be determined based on a predetermined threshold or a minimum ratio with respect to other computation or multiplication terms of the MPA (e.g., less than 5% the size of other terms).

At step 440, the method 400 determines whether to terminate the MPA. The MPA iterations may be terminated when the updated probabilities converge within a predetermined threshold difference or when the number of MPA iterations reaches a predetermined maximum number of MPA iterations. If the updated probabilities converge (e.g., the differences between the updated probabilities and the corresponding previous probability values are less than the threshold) or the maximum number of MPA iterations is reached, then the method 400 proceeds to step 450. Otherwise, the method 400 returns to implement step 420 and then step 430 in a new iteration (e.g., at the MPA detector 310). In another embodiment, the exponential terms can be computed and considered in the computations for FNs and VNs (in steps 420 and 430) at a first or initial iteration of the MPA, and the same values can be reused in the subsequent iterations without recalculating the same terms.

At step 450, the converged probabilities (e.g., LLRs) are decoded at one or more decoders (e.g., the SISO decoders 320). Each vector of probabilities for a VN corresponding to one of the UEs may be sent to a corresponding decoder. At step 460, the method 400 determines (e.g., at the outer-loop for turbo-MPA 325) whether to terminate the outer-loop. The outer-loop may be terminated when the difference between the decoded probabilities (e.g., from the decoders 320) and the converged probabilities using MPA (e.g., from the MPA detector 310) is within a predetermined difference threshold or when the number of outer-loop iterations reaches a predetermined maximum number of outer-loop iterations. If the difference between the decoded probabilities and the last updated probabilities using MPA converges or the maximum number of outer-loop iterations is reached, then the method 400 proceeds to step 470. Otherwise, the method 400 proceeds to step 465, where a priori information of constellation points of each VN is updated based on extrinsic information getting from the decoders (e.g., SISO decoders). The method 400 the returns to step 420 to restart MPA detection (e.g., via an outer-loop from the decoders to the MPA detector). At step 470, the converged decoded probabilities are processed at one or more decision blocks (e.g., decision blocks 330) to detect or estimate the symbols for the UEs. Each vector of probabilities for a VN corresponding to one of the UEs may be sent to a corresponding decision block.

A plurality of simulations were performed to examine the gains from using the low complexity MPA algorithm above, for example as described in the method 400 or the LDS receiver 300. Table 2 shows some of the simulation parameters and details that were considered.

Two threshold parameters are used to control or reduce complexity of the MPA algorithm. The first parameter, $P_{th}$, is a threshold on the incoming probabilities under which the multiplication is skipped (for both function nodes and variable nodes). The second parameter, $N_{th}$, is a threshold on the norm term $\|y_n - h^{[n]T} x^{[n]}\|^2$ above which the multiplication of the exponential term (e.g., exp( ) function) is skipped. The $N_{th}$ can be determined such that the exp(.) term becomes the same $P_{th}$ for $N_{th}$. This makes the optimization simpler (one-dimensional optimization). In this case, $N_{th}$ can be calculated as $N_{th} = \ln(P_{th}^{-1}) N_0$.

Figure 5:
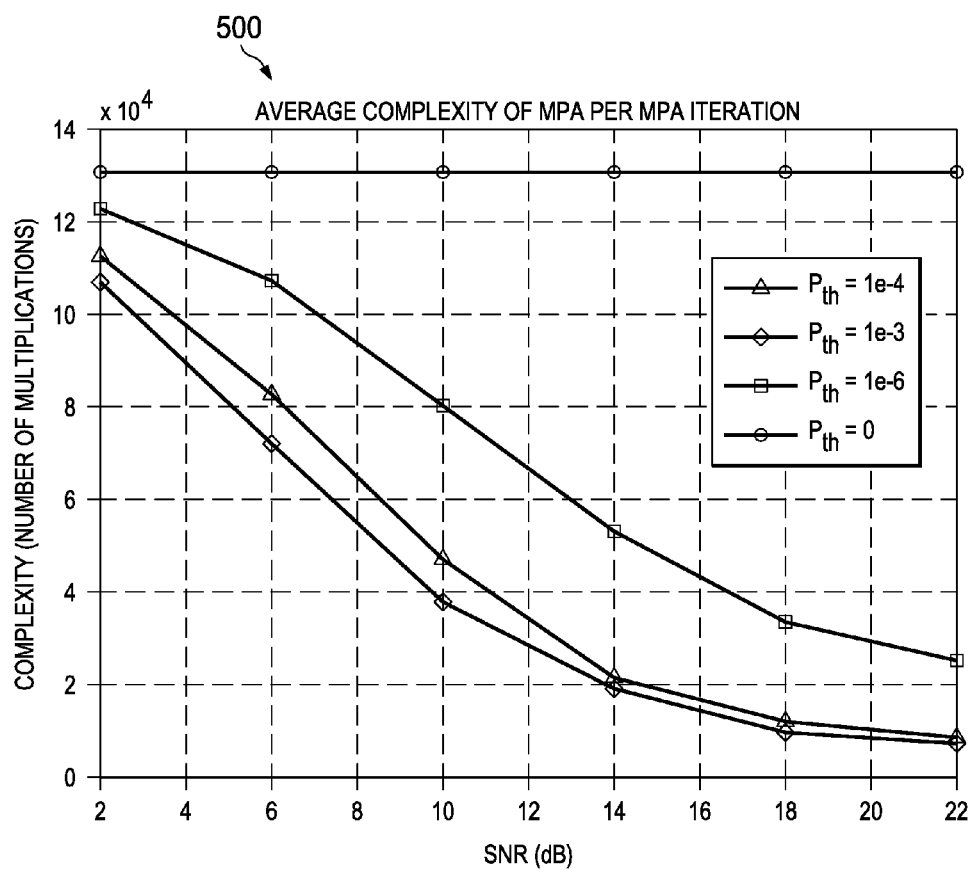
FIG. 5 shows the effect of a threshold parameter, $P_{th}$, on the complexity of the MPA algorithm.
Figure 6:
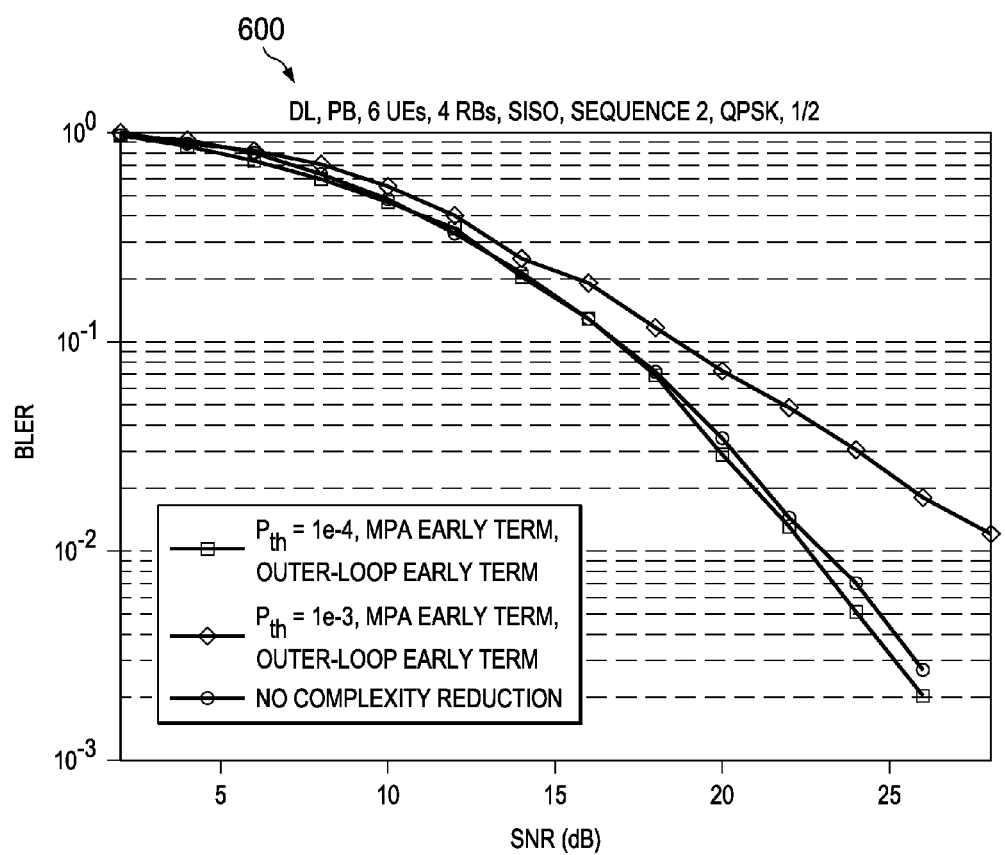
FIG. 6 shows the performance of the MPA algorithm for different $P_{th}$ values.

FIG. 5 shows the effect of $P_{th}$ on the complexity of the MPA algorithm. The graph 500 includes plotted points or curves for the average complexity (as the number of multiplications) per MPA iteration versus the signal to noise ratio (SNR) in decibel (dB) for 4 different $P_{th}$ values, where $P_{th} = 0$ corresponds to the standard MPA case with no complexity reduction. The graph 500 shows that complexity reduction is higher for higher SNR values as the received signals become closer to the actual transmitted points and thus a greater number of exp(.) terms and probability terms can be removed over MPA iterations. FIG. 6 shows the the performance of the MPA algorithm for different $P_{th}$ values. The graph 600 includes plotted points or curves for the block error rate (BLER) versus the SNR for two $P_{th}$ values and the standard MPA algorithm case with no complexity reduction (e.g., without skipping computation or multiplication terms). The graph 600 shows that a $P_{th} \sim 1e-4$ substantially reduces complexity while the BLER performance degradation is negligible.

Figure 7:
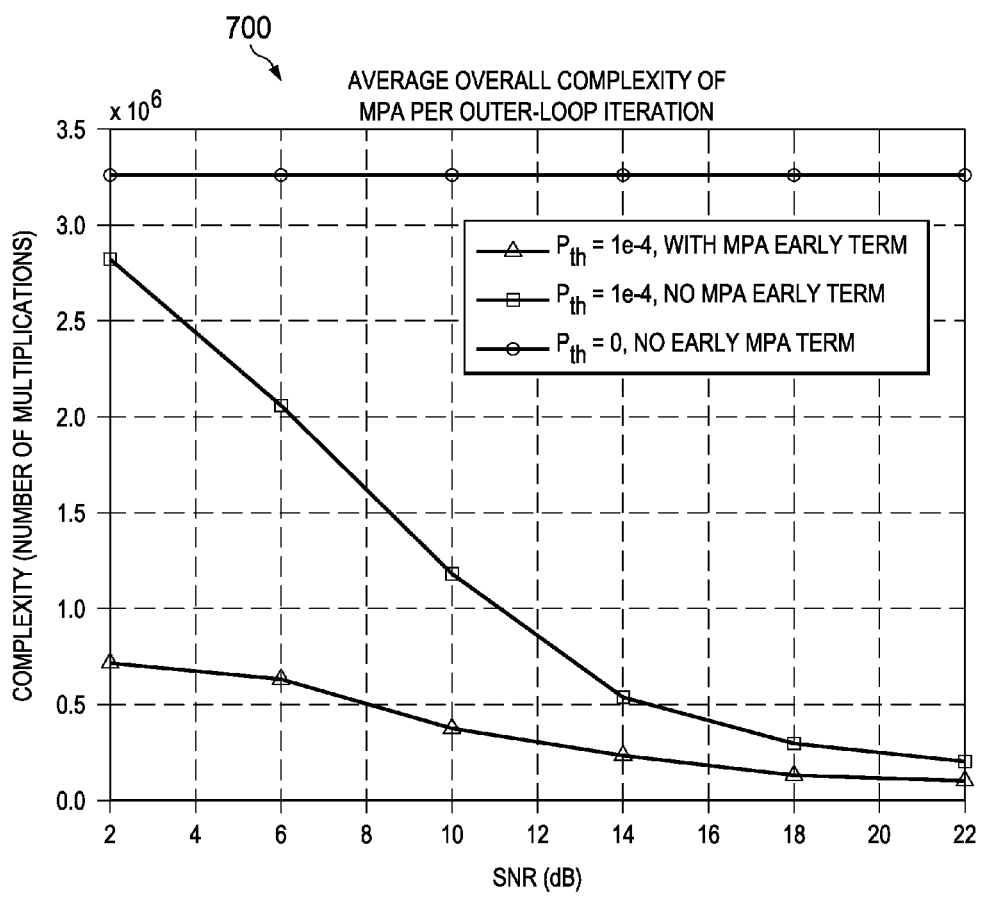
FIG. 7 shows the effect of MPA early termination on the complexity of the algorithm.

FIG. 7 shows the effect of MPA early termination on the complexity of the algorithm. The graph 700 includes plotted points or curves for the complexity (as the number of multiplications) versus the SNR for three different $P_{th}$ values, including $P_{th} = 0$. The graph 700 shows that early termination is substantially effective in the low SNR region where extra MPA iteration is not helpful. The combination of probability thresholds (for excluding computation terms) and MPA early termination can improve the complexity of MPA across the entire SNR region.

Figure 8:
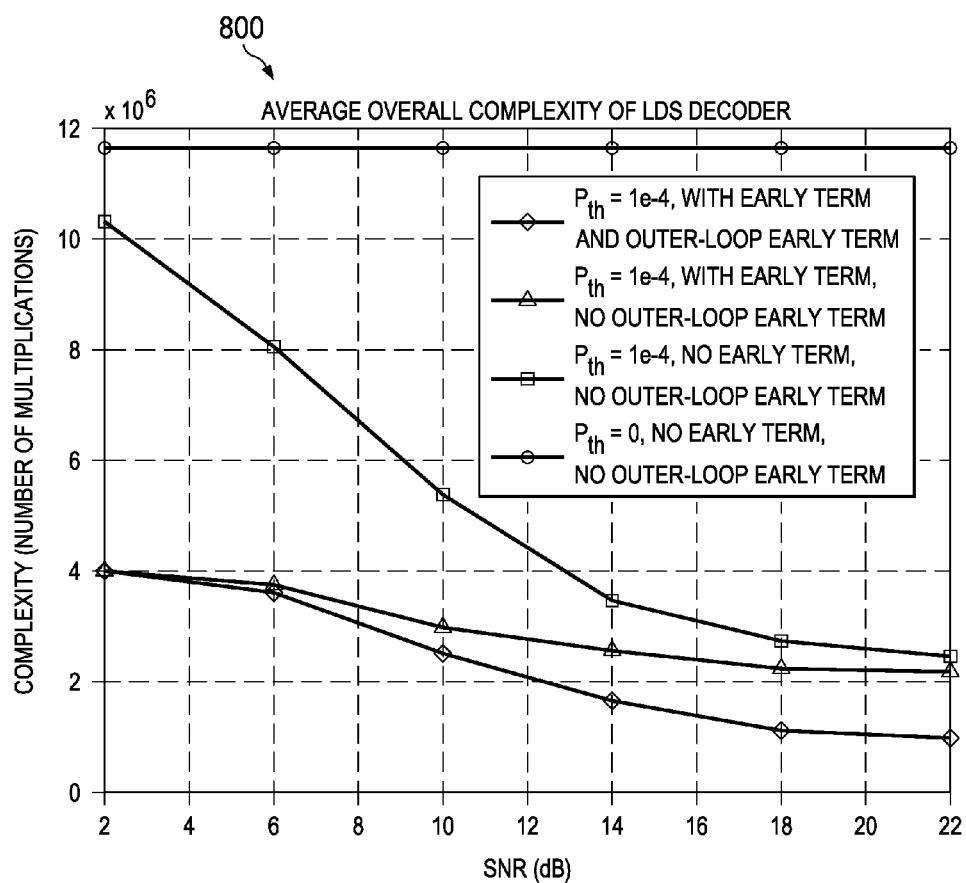
FIG. 8 shows the overall complexity of a LDS receiver at varying SNR values.

FIG. 8 shows the overall complexity of a LDS receiver at varying SNR values. The graph 800 includes plotted points or curves for the complexity (as the number of multiplica-

TABLE 2

Simulation details and details.

| Parameter | Value |
|---|---|
| Resource Assignment | 4 RBs for LDS-OFDM localized |
| Spreading Factor for LDS-OFDM | 4 |
| Spreading Sequence | $S = \begin{bmatrix} 0 & 1 & -1 & 0 & i & 0 \\ 1 & 0 & i & 0 & 0 & -1 \\ 0 & -1 & 0 & i & 0 & 1 \\ i & 0 & 0 & -1 & 1 & 0 \end{bmatrix}$ |
| Overloading Factor | 1.5 (6 UEs) |
| Decoding | Turbo-MPA with maximum 3(or7) outer loop iterations (w and w/o early termination), maximum 25 (or 15) MPA iterations w and w/o early termination |
| Channel Estimation | Perfect |
| Antenna Configuration | SISO or SIMO (1 × 2) |
| Modulation & Coding | QPSK with rate ½ |
| Power Allocation (UL) | Uniform |
| Channel Model | PB with 3 km/h speed | tions) versus the SNR for different combinations of $P_{th}$ values (including $P_{th}=0$) and complexity reduction techniques. The graph 800 shows the overall complexity including the effect of different combinations of probability/exponential threshold (used to exclude computation terms), MPA early termination, and outer-loop early termination versus the SNR. The overall complexity is observed to further decrease for high SNR when all three techniques are combined.

Figure 9:
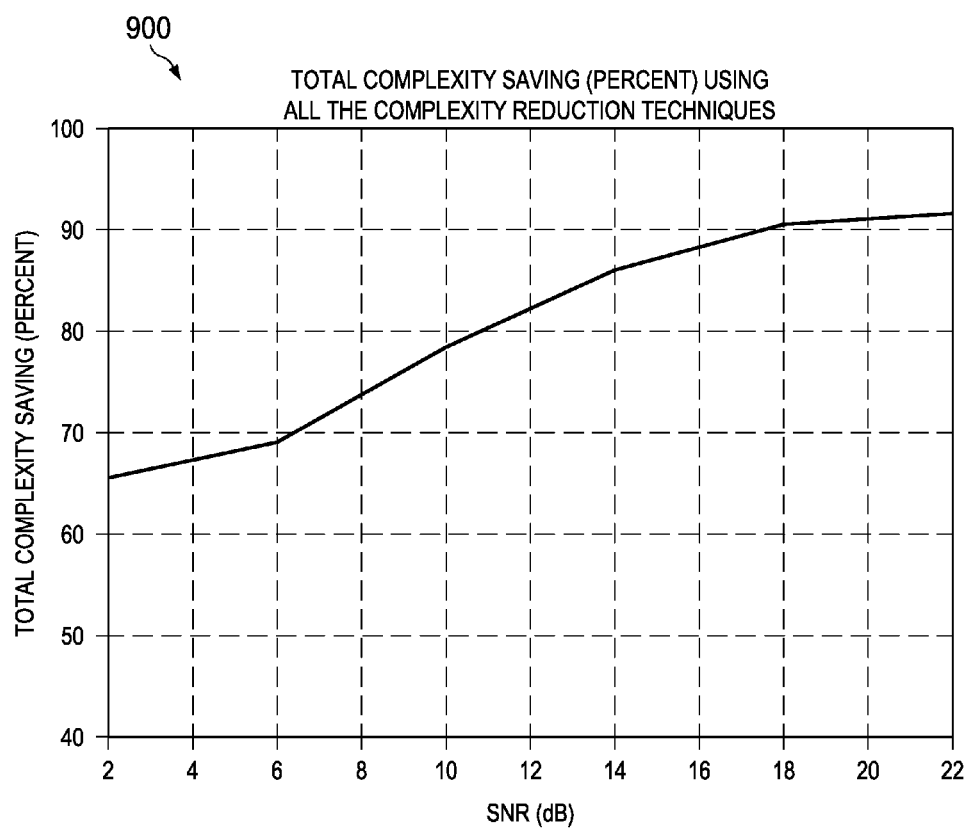
FIG. 9 shows the percentage of overall complexity reduction using reduction techniques of the disclosure.

FIG. 9 shows the percentage of overall complexity reduction using all three complexity reduction techniques. The graph 900 includes plotted points or a curve for the total complexity saving (as a percentage) versus the SNR. The curve is obtained from the ratio of the curve for $P_{th}=1e-4$ with all three techniques in FIG. 8 and the curve for $P_{th}=0$ for a standard MPA without complexity reduction.

Figure 10:
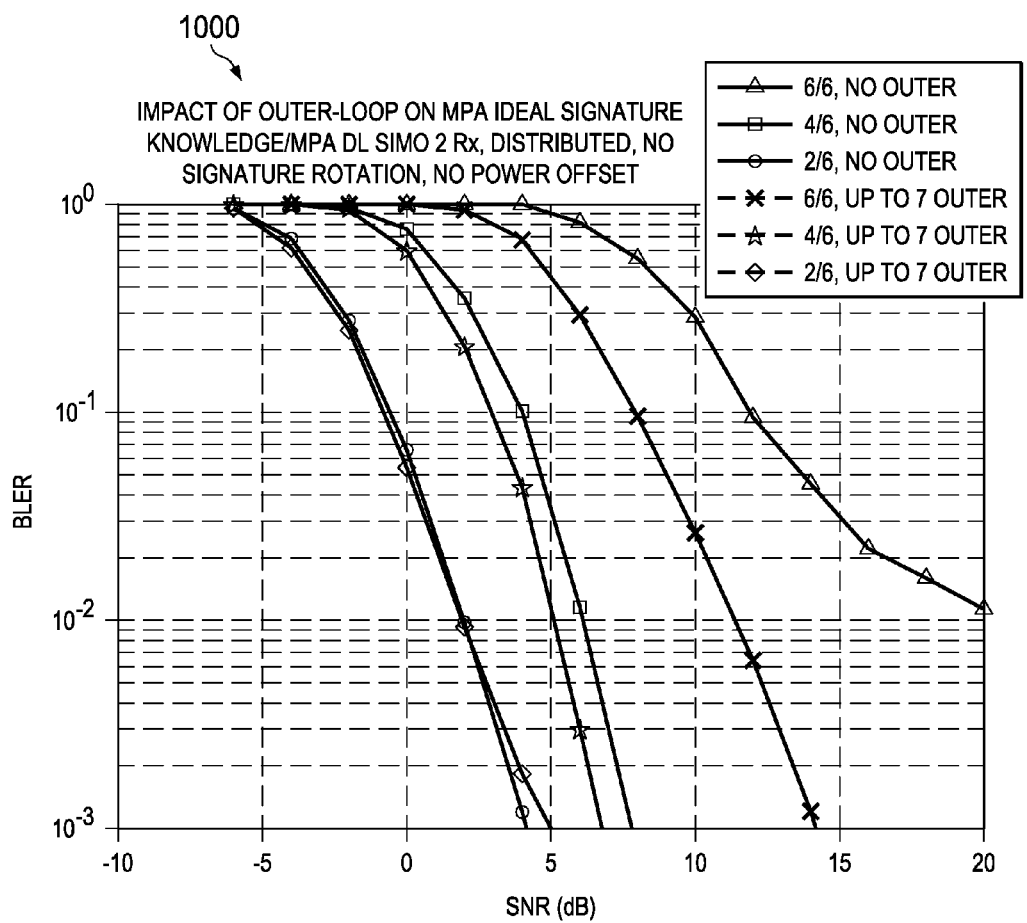
FIG. 10 shows outer-loop gain in the LDS receiver according to an embodiment of the disclosure.

FIG. 10 shows outer-loop gain, e.g., using the outer-loop for turbo-MPA 325 in the LDS receiver 300. The graph 1000 includes plotted points or curves for BLER versus SNR for different number of multiplexed UEs with or without outer-loop iterations. There are three cases (for 6 out of 6, 4 out of 6, and 2 out of 6 active UEs) considered without outer-loop, and three additional cases (for 6 out of 6, 4 out of 6, and 2 out of 6 active UEs) considered for receiver with 7 outer-loop iterations. The results show that the outer-loop provides gain substantially when more UEs are interfering on top of each other. The gain diminishes when the number of scheduled UEs decreases.

Figure 11:
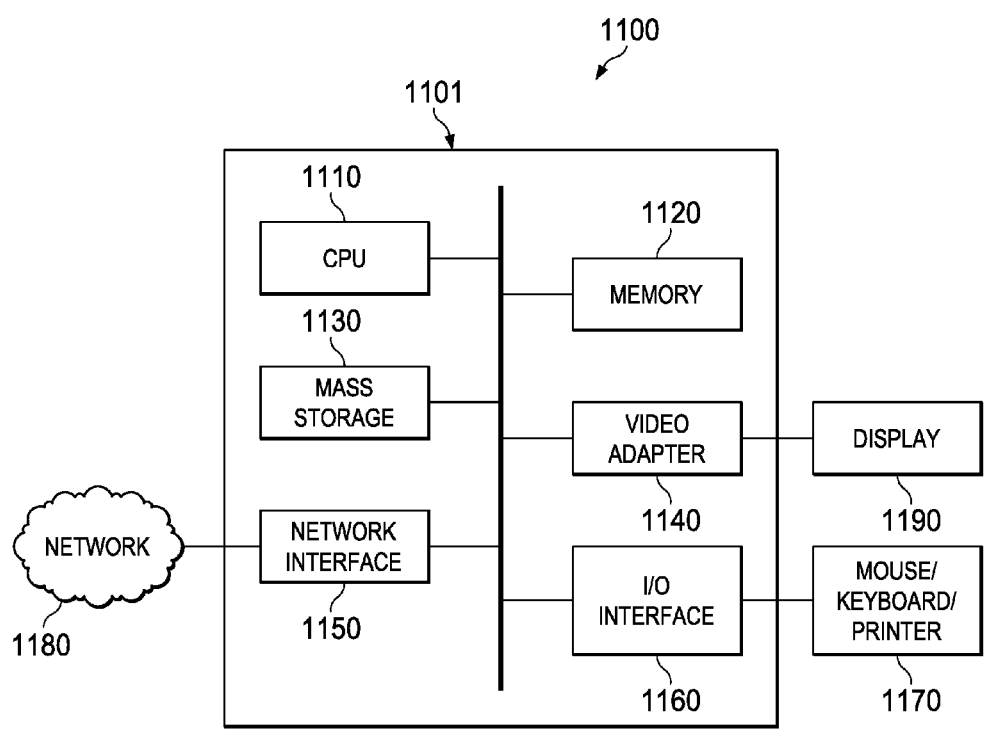
FIG. 11 is a processing system that can be used to implement various embodiments.

FIG. 11 is a block diagram of a processing system 1100 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1100 may comprise a processing unit 1101 equipped with one or more input/output devices, such as a speaker, microphone, mouse, touchscreen, keypad, keyboard, printer, display, and the like. The processing unit 1101 may include a central processing unit (CPU) 1110, a memory 1120, a mass storage device 1130, a video adapter 1140, and an I/O interface 1160 connected to a bus. The bus may be one or more of any type of several bus architectures including a memory bus or memory controller, a peripheral bus, a video bus, or the like.

The CPU 1110 may comprise any type of electronic data processor. The memory 1120 may comprise any type of system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs. In embodiments, the memory 1120 is non-transitory. The mass storage device 1130 may comprise any type of storage device configured to store data, programs, and other information and to make the data, programs, and other information accessible via the bus. The mass storage device 1130 may comprise, for example, one or more of a solid state drive, hard disk drive, a magnetic disk drive, an optical disk drive, or the like.

The video adapter 1140 and the I/O interface 1160 provide interfaces to couple external input and output devices to the processing unit. As illustrated, examples of input and output devices include a display 1190 coupled to the video adapter 1140 and any combination of mouse/keyboard/printer 1170 coupled to the I/O interface 1160. Other devices may be coupled to the processing unit 1101, and additional or fewer interface cards may be utilized. For example, a serial interface card (not shown) may be used to provide a serial interface for a printer.

The processing unit 1101 also includes one or more network interfaces 1150, which may comprise wired links, such as an Ethernet cable or the like, and/or wireless links to access nodes or one or more networks 1180. The network interface 1150 allows the processing unit 1101 to communicate with remote units via the networks 1180. For example, the network interface 1150 may provide wireless communication via one or more transmitters/transmit antennas and one or more receivers/receive antennas. In an embodiment, the processing unit 1101 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for detecting low density signature (LDS) transmissions, the method comprising:
   receiving, at a receiver of a network component, multiplexing signals based on a plurality of function nodes (FNs);
   calculating, at a detector of the network component, first values corresponding to OFDM resources at the FNs using first message passing algorithm (MPA) computations over a plurality of variable nodes (VNs) corresponding to symbols of user equipment (UEs) and the FNs, and using a priori information in an initial vector of probabilities for each of the VNs;
   excluding, from the first MPA computations, first relatively small multiplication terms, wherein the first relatively small multiplication terms include first small exponential terms and first terms with small probabilities;
   updating the probabilities for the VNs using the calculated first values at the FNs without the excluded first relatively small multiplication terms; and
   iteratively repeating calculations to update the FNs using second MPA computations, excluding second relatively small multiplication terms and updating second probabilities for the VNs, wherein the second relatively small multiplication terms include second small exponential terms and second terms with small probabilities.

2. The method of claim 1, wherein the first relatively small multiplication terms and the second relatively small multiplication terms include terms where incoming probability of a branch is relatively small.

3. The method of claim 1, further comprising excluding from the first MPA computations and the second MPA computations a plurality of relatively small summation terms related to the first relatively small multiplication terms and the second relatively small multiplication terms.

4. The method of claim 1, wherein the probabilities are log-likelihood ratios (LLRs) for binary phase-shift keying (BPSK) modulation transmissions.

5. The method of claim 1, wherein the probabilities are normalized reliability values for a plurality of constellation points for each of the VNs.

6. The method of claim 1, further comprising:
detecting convergence of probabilities;
decoding the converged probabilities to obtain extrinsic information for the VNs;
until a difference between the converged probabilities and the decoded converged probabilities reaches a second predetermined threshold or a predetermined maximum number of outer-loop iterations is reached, updating a priori information of constellation points of each of the VNs based on the extrinsic information; and
repeating updating the probabilities for the VNs for one or more additional iterations using the updated a priori information in the initial vector of probabilities for each of the VNs.

7. The method of claim 6, further comprising, upon the difference converging within the second predetermined threshold, processing the decoded converged probabilities for the VNs to obtain the symbols for the UEs.

8. A network component for detecting low density signature (LDS) transmissions, the network component comprising:
a processor; and
a computer readable storage medium storing programming for execution by the processor, the programming including instructions to:
receive multiplexing signals based on a plurality of function nodes (FNs);
calculate first values corresponding to OFDM resources at the FNs using first message passing algorithm (MPA) computations over a plurality of variable nodes (VNs) corresponding to symbols of user equipment (UEs) and the FNs, and using a priori information in an initial vector of probabilities for each of the VNs;
exclude from the first MPA computations first relatively small multiplication terms, wherein the first relatively small multiplication terms include first small exponential terms and first terms with small probabilities;
update the probabilities for the VNs using the calculated first values at the FNs without the excluded first relatively small multiplication terms; and
iteratively repeat calculations to update the FNs using second MPA computations, excluding second relatively small multiplication terms and updating second probabilities for the VNs, wherein the second relatively small multiplication terms include second small exponential terms and second terms with small probabilities.

9. The network component of claim 8, wherein the first relatively small multiplication terms and the second relatively small multiplication terms include terms where incoming probability of a branch is relatively small.

10. The network component of claim 8, wherein the programming further includes instructions to:
decode converged probabilities for the VNs to obtain extrinsic information;
until a difference between the converged probabilities and the decoded converged probabilities reaches a second predetermined threshold or a predetermined maximum number of outer-loop iterations is reached, updating a priori information of a plurality of constellation points of each of the VNs based on the extrinsic information; and
repeat updating the probabilities for the VNs for one or more additional iterations using the updated a priori information in the initial vector of probabilities for each of the VNs.

11. The network component of claim 10, wherein the programming further includes instructions to, upon the difference converging within the second predetermined threshold, processing the decoded converged probabilities for the VNs to obtain a plurality of corresponding symbols for the UEs.

12. A network component for detecting low density signature (LDS) transmissions, the network component comprising:
a receiver configured to receive multiplexing signals based on a plurality of function nodes (FNs);
a first detector configured to calculate a priori information in a vector of probabilities for each of a plurality of variable node (VNs) using multiple iterations of message passing algorithm (MPA) computations over the VNs and the plurality of FNs until the probabilities converge within a predetermined threshold or a predetermined maximum number of MPA iterations is reached and to exclude from the MPA computations relatively small multiplication terms, wherein the relatively small multiplication terms include first small exponential terms and first terms with small probabilities, wherein the plurality of FNs correspond to OFDM resources and the VNs correspond to symbols of user equipment (UEs); and
at least one second detector for the VNs coupled to the first detector and configured to decode the probabilities for each of the VNs and provide calculated probabilities for the VNs.

13. The network component of claim 12, wherein the relatively small multiplication terms include terms where incoming probability of a branch is relatively small, and wherein the predetermined threshold is a predetermined fixed value.

14. The network component of claim 12, further comprising one or more decision blocks coupled to the at least one second detector and configured, upon decoded probabilities converging, to provide a plurality of corresponding symbols for the UEs using the decoded converged probabilities for the VNs.

15. The network component of claim 14, wherein each of the at least one second detector decodes the probabilities for one of the VNs corresponding to one of the UEs, and wherein each one of the one or more decision blocks provides one of the corresponding symbols for one of the UEs.

16. The network component of claim 12, wherein a number of multiplexed signals is smaller than a number of corresponding symbols for the UEs, wherein a number of VNs is equal to the number of corresponding symbols, and wherein a number of FNs is equal to the number of multiplexing signals.

17. The method of claim 1, further comprising early terminating the second MPA computations thereby providing last updated FNs, wherein the second MPA computations are early terminated when a ratio between last relatively small terms and sizes of other terms is less than five percent of the sizes of the other terms.

18. The network component of claim 8, further comprising early terminate the second MPA computations thereby providing last updated FNs, wherein the second MPA computations are early terminated when a ratio between last relatively small terms and sizes of other terms is less than five percent of the sizes of the other terms.

19. The network component of claim 12, further comprising an outer-loop coupled to the at least one second detector and the first detector, the outer-loop configured to receive the calculated probabilities for the VNs from the at least one second detector and the probabilities for each of the VNs from the first detector and configured to calculate extrinsic information in order to send updated a priori information of a plurality of constellation points of each of the VNs to the first detector.

* * * * *